United States Patent
Yui et al.

(10) Patent No.: US 11,927,165 B2
(45) Date of Patent: Mar. 12, 2024

(54) ENGINE CONTROL DEVICE

(71) Applicant: TOYOTA JIDOSHA KABUSHIKI KAISHA, Toyota (JP)

(72) Inventors: Atsushi Yui, Toyota (JP); Tomohiro Nakano, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/137,129

(22) Filed: Apr. 20, 2023

(65) Prior Publication Data

US 2024/0003324 A1 Jan. 4, 2024

(30) Foreign Application Priority Data

Jun. 29, 2022 (JP) ................................ 2022-104846

(51) Int. Cl.
| | | |
|---|---|---|
| *F02P 5/04* | (2006.01) | |
| *F02D 19/02* | (2006.01) | |
| *F02D 41/00* | (2006.01) | |
| *F02D 41/40* | (2006.01) | |
| *F02P 5/15* | (2006.01) | |

(52) U.S. Cl.
CPC ............ *F02P 5/045* (2013.01); *F02D 19/022* (2013.01); *F02D 41/0027* (2013.01); *F02D 41/401* (2013.01); *F02P 5/1502* (2013.01)

(58) Field of Classification Search
CPC .... F02D 41/0027; F02D 19/02; F02D 19/021; F02D 19/022; F02D 19/023; F02D 19/024; F02D 41/0025
See application file for complete search history.

(56) References Cited

U.S. PATENT DOCUMENTS

2015/0101566 A1* 4/2015 Leone ................... F02D 19/081
                                                              123/304
2018/0320624 A1* 11/2018 Okabayashi .......... F02D 41/263

FOREIGN PATENT DOCUMENTS

| JP | 2004239114 A | * | 8/2004 | ......... F02D 41/0025 |
|---|---|---|---|---|
| JP | 2013-136992 A | | 7/2013 | |
| JP | 2013136992 A | * | 7/2013 | |
| JP | 5783036 B2 | * | 9/2015 | |

* cited by examiner

*Primary Examiner* — George C Jin
*Assistant Examiner* — Teuta B Holbrook
(74) *Attorney, Agent, or Firm* — Finnegan, Henderson, Farabow, Garrett & Dunner, LLP

(57) ABSTRACT

The electronic control unit performs a retarding process of retarding the ignition timing when the fuel pressure decreases, and lowers the peak of the combustion pressure in the cylinder, thereby suppressing the inflow of the combustion gas to the injector. Further, the electronic control unit performs an increasing process of increasing the injection amount of the hydrogen gas together with the retarding process, thereby suppressing the torque decrease of the engine due to the retard of the ignition timing.

6 Claims, 3 Drawing Sheets

ENGINE CONTROL DEVICE

CROSS-REFERENCE TO RELATED APPLICATION

This application claims priority to Japanese Patent Application No. 2022-104846 filed on Jun. 29, 2022, incorporated herein by reference in its entirety.

BACKGROUND

1. Technical Field

The present disclosure relates to an engine control device that controls a spark ignition engine provided with an injector that injects gaseous fuel into a cylinder.

2. Description of Related Art

An engine using gaseous fuel such as hydrogen gas includes an engine provided with a fuel tank that stores the gaseous fuel and a fuel pressure adjusting device that reduces a pressure of the gaseous fuel in the fuel tank to a predetermined set pressure and supplies the gaseous fuel to an injector. Conventionally, as a control device for such an engine, a device described in Japanese Unexamined Patent Application Publication No. 2013-136992 (JP 2013-136992 A) is known. In the control device of the above document, when the high load operation of the engine is performed in a state in which the pressure in the fuel tank is equal to or higher than the set pressure, injection of the gaseous fuel is started near the compression top dead center, and ignition is performed during the injection period. Thus, diffusion combustion is performed in the cylinder.

In such an engine, the internal pressure of the fuel tank decreases as the gaseous fuel in the fuel tank decreases. When the internal pressure of the fuel tank becomes lower than the set pressure, the pressure of the gaseous fuel supplied to the injector becomes lower than the set pressure. As a result, the injection pressure of the gaseous fuel of the injector also decreases. On the other hand, the pressure in the cylinder during the compression stroke increases as a piston approaches the compression top dead center. In the state in which the injection pressure decreases, the pressure in the cylinder may exceed the injection pressure at a time near the compression top dead center, and it may be difficult to continue the injection.

On the other hand, the above-described engine control device makes it possible to continue the fuel injection even in the state where the injection pressure decreases by advancing the injection timing of the gaseous fuel when the high load operation of the engine is performed in the state in which the internal pressure of the fuel tank is lower than the set pressure. However, when the injection period is advanced, the diffusion combustion cannot be continued by performing ignition during the injection period. Therefore, the above-described engine control device switches the combustion in the cylinder from the diffusion combustion to the premixed combustion by changing the ignition timing so as to perform the ignition after the end of the injection together with advance of the injection period.

SUMMARY

The injector is configured to inject and stop the fuel by opening and closing a nozzle hole in response to driving of a needle by an electromagnetic solenoid. The needle is biased in a direction to close the nozzle hole by the spring load and the pressure of the gaseous fuel supplied to the injector. When the injection is stopped, the nozzle hole is kept closed by the above loads, thereby suppressing the inflow of the combustion gas into the inside of the injector.

However, as the pressure of the gaseous fuel supplied to the injector decreases, the load applied to the needle correspondingly decreases. Therefore, when the internal pressure of the fuel tank decreases, the nozzle hole may open without being resistant to the combustion pressure in the cylinder. As a result, there is a possibility that the combustion gas flows into the injector through the open nozzle hole.

An engine control device that solves the above issue is a device that controls a spark ignition engine provided with an injector that injects gaseous fuel into a cylinder. The engine control device executes a retarding process of retarding an ignition timing of an air-fuel mixture in the cylinder after the gaseous fuel is injected when a fuel pressure that is a pressure of the gaseous fuel supplied to the injector is lower than a predetermined threshold value as compared with when the fuel pressure is equal to or more than the threshold value. Further, the engine control device executes an increasing process of increasing an injection amount of the gaseous fuel by the injector when the ignition timing is retarded by the retarding process as compared with when the injection timing is not retarded.

When the ignition timing is retarded, the combustion becomes slow, and the peak of the combustion pressure in the cylinder becomes lowered. Therefore, inflow of the combustion gas into the inside of the injector when the fuel pressure decreases is suppressed by executing the retarding process. Further, at this time, it is possible to suppress the torque decrease due to the retardation of the ignition timing by increasing the injection amount of the gaseous fuel.

When the fuel pressure decreases, the injection rate of the gaseous fuel of the injector decreases. Therefore, when the fuel pressure decreases, the injection period of the injector required for injecting the necessary amount of the gaseous fuel is extended. Further, since the injection amount is increased in the above-described increasing process when the fuel pressure decreases, the injection period of the injector becomes further longer. Therefore, in the above-described engine control device, there is a possibility that the injection period of the injector becomes significantly longer when the fuel pressure decreases as compared with when the fuel pressure does not decrease. Therefore, the above-described engine control device preferably executes an extending process of extending an injection permission period in which an injection of the gaseous fuel is permitted when the injection amount is increased by the increasing process as compared with when the injection amount is not increased.

When the injection start timing of the gaseous fuel is advanced, the time in which the gaseous fuel is present in the cylinder in an unburned state becomes longer. Moreover, retarding the ignition timing also increases the above-described time. When the above-described time becomes longer, the amount of heat received by the gaseous fuel from the wall surface of the combustion chamber after the injection increases. As a result, an increase in the temperature of the gaseous fuel in the cylinder raises the possibility that the gaseous fuel self-ignites before the ignition. On the other hand, when the extension of the injection permission period by the extending process is performed by delaying the end timing of the injection permission period while the start timing of the injection permission period is maintained, self-ignition of the gaseous fuel is less likely to occur. Further, when the injection amount is increased by the increasing process, occurrence of self-ignition of the gaseous fuel can be suppressed also by delaying the end timing of the injection of the gaseous fuel by the injector as compared with when the injection amount is not increased.

For example, the above-described engine control device is preferably applied to an engine including: a fuel tank that stores the gaseous fuel; and a fuel pressure adjusting device that reduces the pressure of the gaseous fuel in the fuel tank to a predetermined set pressure and supplies the gaseous fuel to the injector.

In the engine configured as described above, when the remaining amount of the gaseous fuel in the fuel tank decreases, the internal pressure of the tank decreases. When the internal pressure of the fuel tank becomes lower than the set pressure, the fuel pressure of the injector becomes lower than the set pressure. Therefore, in such an engine, the inflow of the combustion gas to the injector in response to the decrease in the fuel pressure is likely to occur, and the above-described engine control device is preferably applied.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Configuration of Engine Control Device

Figure 1:
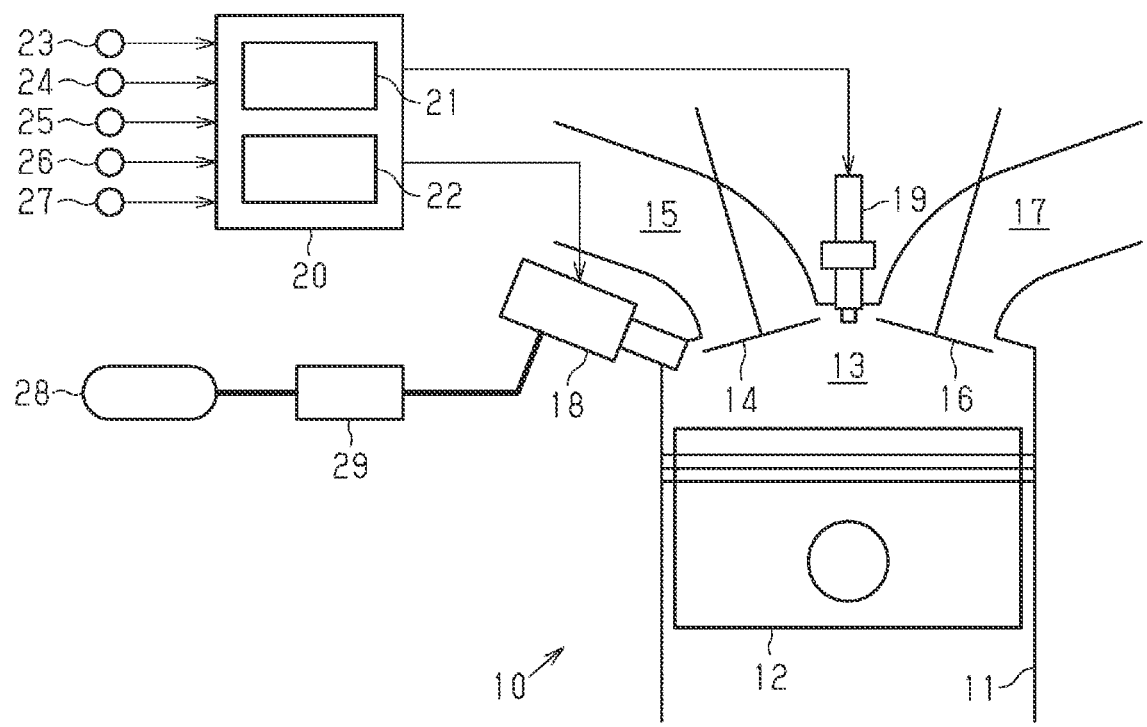
FIG. 1 is a diagram schematically illustrating a configuration of an embodiment of an engine control device.

Hereinafter, an embodiment of an engine control device will be described in detail with reference to FIGS. 1 to 4. First, a configuration of an engine control device according to the present embodiment will be described with reference to FIG. 1. The engine 10 to be controlled by the engine control device of the present embodiment is mounted on a vehicle. Further, the engine 10 is configured as a hydrogen gas engine using hydrogen gas as a fuel.

The engine 10 includes one or more cylinders 11. A piston 12 is disposed inside the cylinder 11 so as to be able to reciprocate in the vertical direction in the drawing. A combustion chamber 13 for performing combustion is defined by a piston 12 inside the cylinder 11. An intake port 15 is connected to an upper portion of the cylinder 11 via an intake valve 14. An exhaust port 17 is connected to an upper portion of the cylinder 11 via an exhaust valve 16. Further, an injector 18 for injecting hydrogen gas into the cylinder 11 and a spark plug 19 for igniting the hydrogen gas injected by the injector 18 are installed in an upper portion of the cylinder 11.

The injector 18 is connected to a fuel tank 28 that stores hydrogen gas via a fuel pressure adjusting device 29. In the following explanation, the pressure of the hydrogen gas in the fuel tank 28 is referred to as a tank internal pressure PT. Further, the pressure of the fuel supplied to the injector 18 through the fuel pressure adjusting device 29 is referred to as a fuel pressure PF. The fuel pressure adjusting device 29 reduces the pressure of the hydrogen gas in the fuel tank 28 to a predetermined set pressure P0 and supplies the reduced pressure to the injector 18. More specifically, when the tank internal pressure PT is higher than the set pressure P0, the fuel pressure adjusting device 29 reduces the pressure of the hydrogen gas in the fuel tank 28 to the set pressure P0 and supplies the reduced pressure to the injector 18. The fuel pressure PF at this time is equal to the set pressure P0. On the other hand, when the tank internal pressure PT is lower than the set pressure P0, the fuel pressure adjusting device 29 supplies the hydrogen gas in the fuel tank 28 to the injector 18 without reducing the pressure. The fuel pressure PF at this time becomes a pressure substantially equal to the tank internal pressure PT. That is, the fuel pressure PF at this time is lower than the set pressure P0. In the following explanation, a case where the fuel pressure PF becomes lower than the set pressure P0 is referred to as a case where the fuel pressure PF decreases.

The electronic control unit 20 for controlling the engine 10 includes an arithmetic processing device 21 and a storage device 22. The storage device 22 stores programs and data used for control. The arithmetic processing device 21 executes a program read from the storage device 22 to perform various processes related to the control of the engine 10. In the present embodiment, the electronic control unit 20 corresponds to an engine control device.

A crank angle sensor 23, an air flow meter 24, a water temperature sensor 25, an accelerator pedal sensor 26, and a tank pressure sensor 27 are connected to the electronic control unit 20. The crank angle sensor 23 is a sensor that detects the rotational phase of the crankshaft of the engine 10. The air flow meter 24 is a sensor that detects an intake air amount of the engine 10. The water temperature sensor 25 is a sensor that detects an engine water temperature THW that is the temperature of the coolant of the engine 10. The accelerator pedal sensor 26 is a sensor that detects an accelerator pedal operation amount ACC of the driver. The tank pressure sensor 27 is a sensor that detects a tank internal pressure PT which is a pressure of hydrogen gas in the fuel tank 28. The electronic control unit 20 controls the engine 10 by operating the fuel injection of the injector 18, the ignition timing of the spark plug 19, and the like based on the detection results of these sensors. Inflow of combustion gases into the injector 18

In the above-described engine 10, when the remaining amount of hydrogen gas in the fuel tank 28 is reduced and the tank internal pressure PT falls below the set pressure P0, the fuel pressure PF supplied to the injector 18 also falls below the set pressure P0. When the fuel pressure PF decreases, there is a possibility that the combustion gases in the combustion chamber 13 flow into the injector 18. The inflow of the combustion gas may deteriorate the durability performance of the injector 18. Further, if the inflowing combustion gas remains in the injector 18 until the next injection, the remaining combustion gas is injected together with the hydrogen gas, so that an appropriate amount of the hydrogen gas may not be injected.

Figure 2:
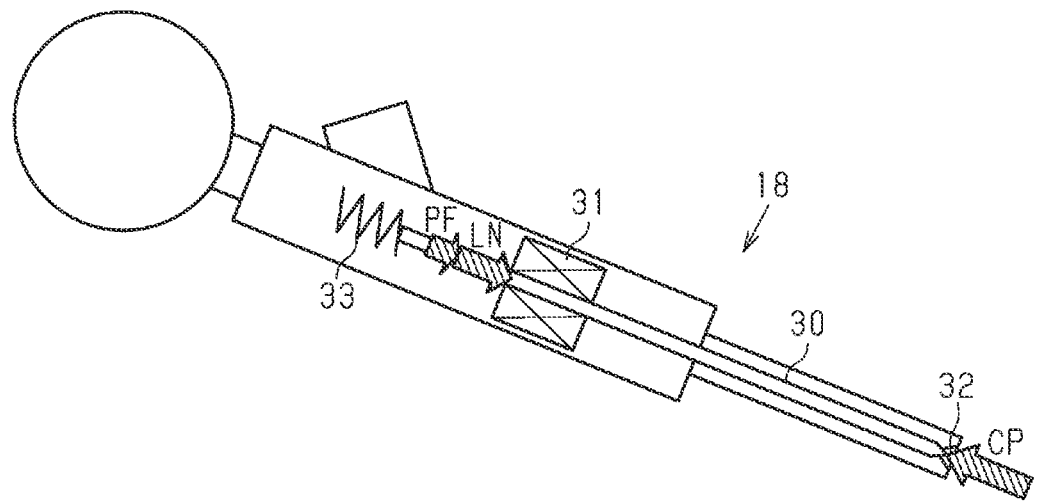
FIG. 2 is a diagram schematically illustrating a structure of an injector of an engine to which the engine control device is applied.

FIG. 2 shows a schematic structure of the injector 18. The injector 18 includes a needle 30, an electromagnetic solenoid 31, a nozzle hole 32, and a needle spring 33. Hydrogen gas is supplied from the fuel tank 28 to the inside of the injector 18 via the fuel pressure adjusting device 29. The nozzle hole 32 is an injection port of hydrogen gas that communicates the inside and the outside of the injector 18. The injector 18 is assembled to the engine 10 in a state where the nozzle hole 32 is exposed in the combustion chamber 13. The needle 30 is a valve body that opens and closes the nozzle hole 32. The electromagnetic solenoid 31 generates an electromagnetic attraction force for driving the needle 30 on the opening side of the nozzle hole 32 in response to energization. The needle spring 33 is a spring that biases the needle 30 toward the side that closes the nozzle hole 32. In the following description, a load for urging the needle 30 toward the side where the nozzle hole 32 is closed is referred to as a load in the closing direction. In addition, a load for urging the needle 30 toward the opening side of the nozzle hole 32 is referred to as a load in the opening direction.

In the needle 30 when the injector 18 is stopping the hydrogen gas injection, the fuel pressure PF of the hydrogen gas supplied to the injector 18 and the spring load LN of the needle spring 33 are applied as a closing load. On the other hand, the combustion pressure CP of the combustion chamber 13 is applied as an opening-direction load to the distal end of the needle 30 when the combustion is being performed in the combustion chamber 13.

When the fuel pressure PF decreases when the tank internal pressure PT falls below the set pressure P0, the closing load applied to the needle 30 decreases. Therefore, the needle 30 moves in the opening direction without resisting the combustion pressure CP, and the nozzle hole 32 opens. In addition, there is a possibility that the combustion gas in the combustion chamber 13 flows into the injector 18 through the open nozzle hole 32.

Ignition Injection Control

The electronic control unit 20 suppresses the inflow of the combustion gas to the injector 18 as described above through the control of the injection and ignition of the hydrogen gas in the engine 10. Details of such control are described below.

It should be noted that the values of the respective times shown below represent the advance angle amount of the rotation angle of the crankshaft, which is the output shaft of the engine 10, from the compression top dead center. Therefore, the time when the value is large is earlier than the time when the value is small. In addition, the values of the respective periods shown below represent the amount of change in the rotation angle of the crankshaft in the corresponding period. Therefore, even if the length of the period is constant, when the engine speed NE is high, the real time of the corresponding period is shorter than when the engine speed NE is low.

Figure 3:
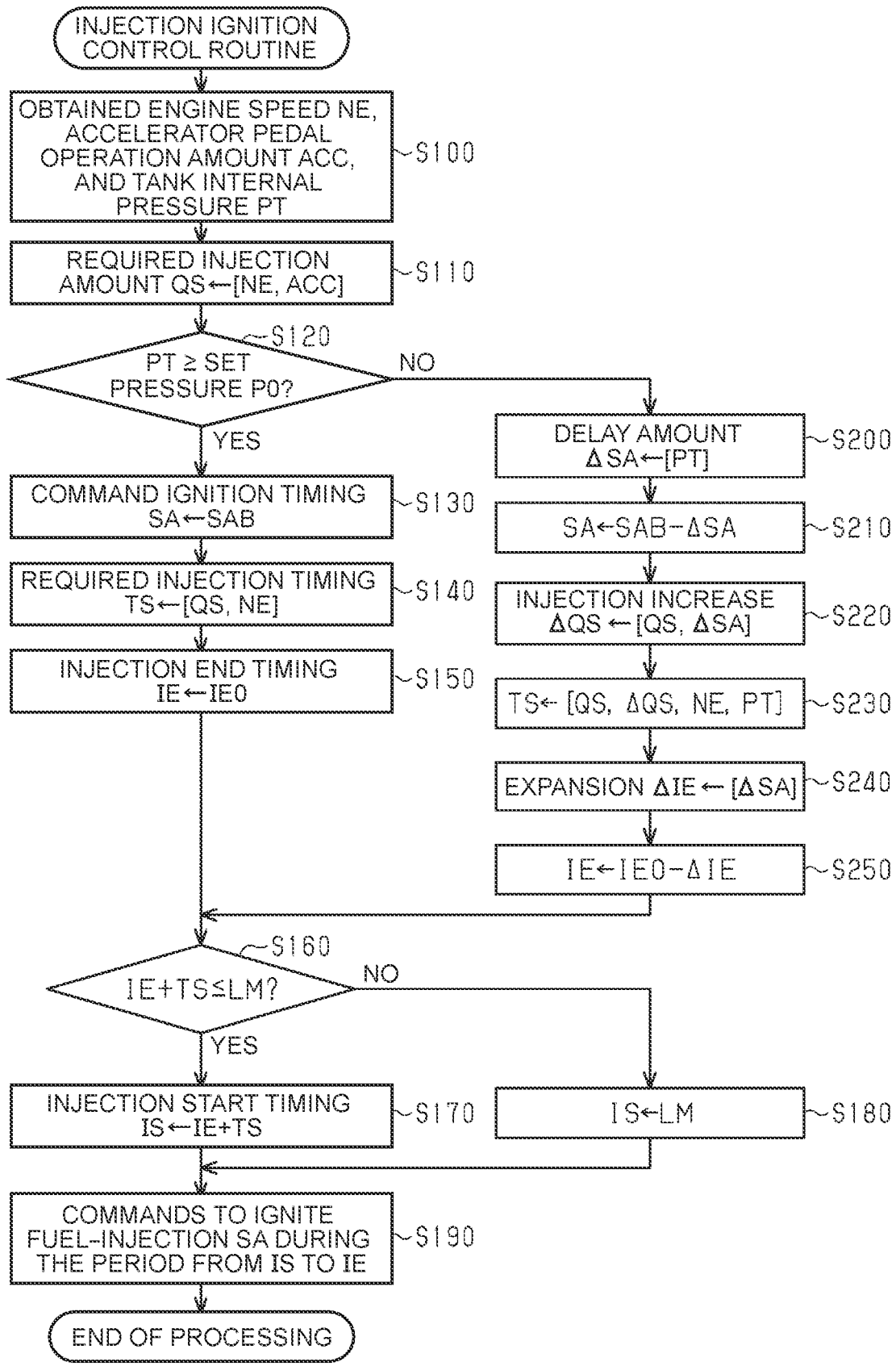
FIG. 3 is a flowchart illustrating a processing procedure of an injection ignition control routine executed by the engine control device.

FIG. 3 shows a processing procedure of an injection ignition control routine executed by the electronic control unit 20 for controlling injection and ignition of hydrogen gas in the engine 10. During operation of the engine 10, the electronic control unit 20 repeatedly executes the same routine every predetermined control cycle.

When the present routine is started, the electronic control unit 20 first acquires the engine speed NE, the accelerator pedal operation amount ACC, and the tank internal pressure PT in S100 of steps. Subsequently, in the step S110, the electronic control unit 20 calculates the required injection amount QS based on the engine speed NE and the accelerator pedal operation amount ACC. The required injection amount QS represents an injection amount of hydrogen gas required to generate the power required by the driver while the basic ignition timing SAB to be described later is set as the ignition timing.

Next, the electronic control unit 20 determines whether or not the tank internal pressure PT is equal to or higher than the set pressure P0. When the tank internal pressure PT is equal to or higher than the set pressure P0 (YES), the electronic control unit 20 advances the process to the step S130, and when the tank internal pressure PT is lower than the set pressure P0 (NO), to the step S200.

In S130 of steps, the electronic control unit 20 sets the basic ignition timing SAB as the command ignition timing SA which is a command value of the ignition timing. The basic ignition timing SAB may be fixed. The basic ignition timing SAB may be changed according to the operating condition of the engine 10. The electronic control unit 20 calculates the basic ignition timing SAB based on, for example, the engine speed NE and the required injection amount QS.

Subsequently, in the stepping S140, the electronic control unit 20 calculates the required injection period TS based on the engine speed NE and the required injection amount QS. The required injection period TS represents an injection period of the hydrogen gas of the injector 18 required for the injection of the hydrogen gas corresponding to the required injection amount QS. As described above, the value of the period represents the amount of change in the crank angle within the period. Therefore, even when the required injection amount QS is the same value, the value of the required injection period TS becomes a larger value than when the engine speed NE is high. The required injection period TS also varies depending on the fuel pressure PF. However, the fuel pressure PF at this time is determined to be the set pressure P0 because the tank internal pressure PT is equal to or higher than the set pressure P0. Therefore, the required injection period TS at this time is calculated on the assumption that the fuel pressure PF is the set pressure P0.

Subsequently, in S150 of steps, the electronic control unit 20 sets the predetermined basic injection end timing IE0 as the injection end timing IE. If the time from the end of the hydrogen gas injection to the ignition is too short, the fuel concentration around the spark plug 19 becomes thin due to insufficient mixing of the intake air and the hydrogen gas. As a result, an ignition failure may occur. In the basic injection end timing IE0, when the ignition is performed at the basic ignition timing SAB, a timing at which the retardation limit of the end timing of the hydrogen-gas injection capable of ensuring the ignitability is set.

Next, in the step S160, the electronic control unit 20 determines whether or not a time period (=IE+TS) which is earlier than the injection end timing IE by the required injection period TS is a time period earlier than the limit injection start timing LM. The timing that is earlier than the injection end timing IE by the required injection period TS, that is, represents the start timing of the hydrogen gas injection necessary for performing the hydrogen gas injection in the required injection period TS and ending the injection at the injection end timing IE. In the following description, this time is referred to as a required injection start timing. On the other hand, the critical injection start timing LM represents the start timing of the injection permission period, which is a period in which fuel injection is permitted. When the start timing of the hydrogen gas injection is advanced, the time during which the hydrogen gas is present in the cylinder 11 in an unburned state becomes longer. Moreover, retarding the ignition timing also increases the same time. When the same time period becomes longer, the amount of heat received by the hydrogen gas after injection from the wall surface of the combustion chamber 13 increases. As a result, there is a high possibility that the hydrogen gas self-ignites before ignition in the cylinder 11. The critical injection start timing LM is set in order to suppress self-ignition of such hydrogen-gas.

When the required injection start timing is a timing after the limit injection start timing LM (S160: YES), the electronic control unit 20 sets the required injection start timing as the injection start timing IS in S170 of steps. On the other hand, when the required injection start timing is earlier than the limit injection start timing LM (S160: NO), the electronic control unit 20 sets the limit injection start timing LM as the injection start timing IS in S180 of steps.

After the processing of the step S170 or S180, the electronic control unit 20 advances the processing to step S190. Then, the electronic control unit 20 instructs the hydrogen-gas injection in the period from the injection start timing IS to the injection end timing IE and the ignition of the command ignition timing SA in the step S190, and then ends the process of this routine in the current control cycle.

On the other hand, when the tank internal pressure PT is less than the set-pressure P0 (S120: NO) and the process is advanced to the step S200, the electronic control unit 20 performs the process from the subsequent step S200 to S250 instead of the process from the step S130 to S150. In S200 of steps, the electronic control unit 20 calculates the retardation amount ΔSA based on the tank internal pressure PT. The electronic control unit 20 calculates, as the value of the retardation amount ΔSA, a value that is larger than the value when the tank internal pressure PT is low. Then, in the subsequent S210 of steps, the electronic control unit 20 sets a timing later than the basic ignition timing SAB by the retard amount ΔSA to the command ignition timing SA.

In S220 of steps, the electronic control unit 20 calculates the value of the injection increase amount ΔQS based on the required injection amount QS and the retard amount ΔSA. When the ignition timing is retarded, the engine torque decreases. The reduction in engine torque can be compensated by increasing the amount of hydrogen gas injected. The electronic control unit 20 calculates, as the value of the injection increase amount ΔQS, an increase value of the hydrogen gas injection amount required for an increase in the engine torque of an amount equal to a decrease in the engine torque due to the retard of the ignition timing corresponding to the retard amount ΔSA.

In the step S230, the electronic control unit 20 calculates the required injection period TS based on the required injection amount QS, the injection increase amount ΔQS, and the tank internal pressure PT. At this time, the electronic control unit 20 calculates the period required for the injection of the hydrogen gas corresponding to the sum of the required injection amount QS and the injection increase amount ΔQS as the required injection period TS at the present tank internal pressure PT.

In S240 of steps, the electronic control unit 20 calculates the expansion amount ΔIE based on the retardation amount ΔSA. The electronic control unit 20 calculates the value of the enlargement amount ΔIE so that the value becomes larger than the value when the retard amount ΔSA is large. Then, in the subsequent step S250, the electronic control unit 20 sets a timing later than the basic injection end timing IE0 by the expansion amount ΔIE as the injection end timing IE, and then advances the process to the above-described step S160.

Operation and Effect of the Embodiment

The operation and effects of the engine control device of the present embodiment configured as described above will be described.

When the tank internal pressure PT is equal to or higher than the set pressure P0, the fuel pressure PF of the hydrogen gas supplied to the injector 18 is maintained at the set pressure P0. At this time, the electronic control unit 20 ignites the basic ignition timing SAB in the injection ignition control routine. At this time, the electronic control unit 20 operates the spark plug 19 and the injector 18 so as to inject hydrogen gas corresponding to the required injection amount QS.

On the other hand, when the tank internal pressure PT falls below the set-pressure P0, the fuel pressure PF of the hydrogen gas supplied to the injector 18 becomes lower than the set-pressure P0. As described above, when the fuel pressure PF decreases, the closing load applied to the needle 30 during stopping injection decreases, and the combustion gases in the combustion chamber 13 easily flow into the injector 18. On the other hand, when the tank internal pressure PT falls below the set-pressure P0, the electronic control unit 20 operates the spark plug 19 so as to perform the ignition at a timing later than the basic ignition timing SAB by the retard-angle ΔSA. In the present embodiment, the ignition timing is set so as to perform ignition after the hydrogen gas injection is completed. Therefore, in the present embodiment, when the fuel pressure PF is lower than the set pressure P0, a retarding process is performed in which the ignition timing of the air-fuel mixture in the cylinder 11 after the injection of the hydrogen gas is completed is retarded from the ignition timing when the fuel pressure PF is equal to or higher than the set pressure P0. In the present embodiment, the retarding process is performed through the process of the step S210, S220 in FIG. 3.

Figure 4:
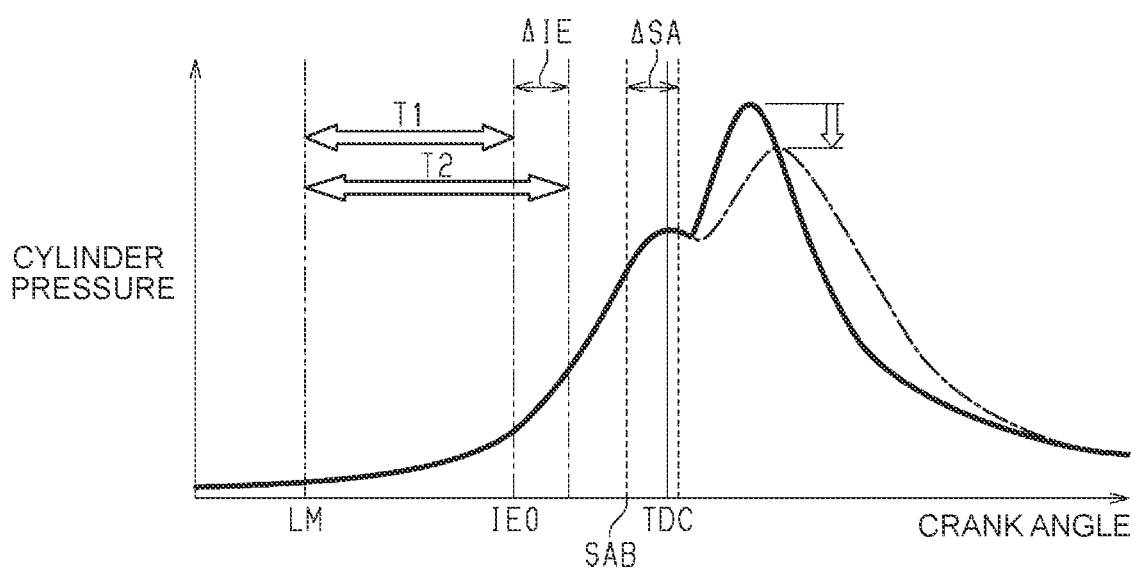
FIG. 4 is a graph showing the transition of the in-cylinder pressure.

In FIG. 4, the transition of the pressure in the cylinder when the ignition is performed in the basic ignition timing SAB is indicated by a solid line. In addition. FIG. 4 shows the transition of the pressure in the cylinder when the ignition is performed at a time later than the basic ignition timing SAB by the retard amount ΔSA by a dashed-dotted line. When the ignition timing is retarded, the combustion becomes slow, so that the in-cylinder pressure generated by the combustion after the ignition, that is, the peak-value of the combustion pressure CP decreases. Therefore, even when the fuel pressure PF decreases and the closing load applied to the needle 30 of the injector 18 decreases, the combustion gases hardly flow into the injector 18.

When the tank internal pressure PT falls below the set pressure P0, the electronic control unit 20 sets the required injection period TS so as to inject the hydrogen gas corresponding to the sum of the required injection amount QS and the injection increase amount ΔQS. That is, when the retardation of the ignition timing for suppressing the inflow of the combustion gas of the injector 18 is performed, the electronic control unit 20 performs an increasing process of increasing the injection amount of the hydrogen gas by the injector 18 as compared with the case where the retardation is not performed. In the present embodiment, the increasing process is performed through the process of S260 from the step S230 in FIG. 3. By increasing the injection amount of the hydrogen gas in this manner, the torque decrease of the engine 10 due to the retardation of the ignition timing can be suppressed.

When the tank internal pressure PT is equal to or higher than the set pressure P0, the electronic control unit 20 sets a period T1 from the limit injection start timing LM to the basic injection end timing IE0 as an injection permission period for allowing hydrogen-gas injection. On the other hand, when the fuel pressure PF decreases, the injection rate of the hydrogen gas in the injector 18 decreases. Therefore, when the fuel pressure PF decreases, the injection time of the injector 18 required for the required hydrogen-gas injection becomes longer. Further, in the above-described increasing process, since the injection amount is increased when the fuel pressure PF is decreased, the injection period of the injector 18 is further increased. Therefore, when the fuel pressure PF decreases, the required injection amount QS of the hydrogen gas cannot be injected in many cases in the above-described period T1. On the other hand, when the fuel pressure PF decreases, the electronic control unit 20 performs an extending process of enlarging the injection permission period from the period T1 to the period T2. Therefore, even when the fuel pressure PF is lowered, the injection amount of the hydrogen-gas is less likely to be insufficient.

In the extending process, the electronic control unit 20 delays the end timing of the injection permission period while maintaining the start timing of the injection permission period at the limit injection start timing LM. More specifically, in the extending process, the electronic control unit 20 calculates the enlargement amount ΔIE based on the retard amount ΔSA of the ignition timing by the retarding process. Then, a timing later than the basic injection end timing IE0 by the enlargement amount ΔIE is set as the end timing of the injection permission period. In the present embodiment, the extending process is performed through the process of the step S240, S250 in FIG. 2.

As described above, the critical injection start timing LM is set in order to suppress the hydrogen-gas from self-igniting. When the ignition timing is retarded, a period in which the hydrogen gas is present in the cylinder 11 in an unburned state becomes longer. At this time, if the start timing of injection is advanced, the period of synchronization becomes longer, and self-ignition of hydrogen gas is likely to occur. On the other hand, in the basic injection end timing IE0, a timing at which the retardation limit of the end timing of the hydrogen-gas injection capable of securing the ignitability is set when the ignition is performed at the basic ignition timing SAB. When the ignition timing is retarded, the time at which the retardation limit is reached is delayed by that amount. Therefore, if the end timing of the injection permission period is delayed while the start timing of the injection permission period is maintained, the injection permission period can be expanded while suppressing both the self-ignition of the hydrogen gas and the deterioration of the ignitability.

According to the engine control device of the present embodiment described above, the following effects can be obtained.

(1) The electronic control unit 20 performs a retarding process of retarding the ignition timing of the air-fuel mixture in the cylinder 11 after the end of injection from the time when the fuel pressure PF is equal to or higher than the set pressure P0 when the tank internal pressure PT decreases and the fuel pressure PF becomes lower than the set pressure P0. Further, when the retard of the ignition timing is performed by the retarding processing, the electronic control unit 20 performs the increasing process for increasing the injection amount of the hydrogen gas by the injector 18 than when the retard is not performed. When the ignition timing is retarded, the combustion becomes slow, and the peak of the combustion pressure CP in the cylinder 11 decreases. Therefore, by performing the retarding process, inflow of the combustion gases into the injector 18 at the time of lowering of the fuel pressure PF is suppressed. Further, at this time, by increasing the injection amount of the hydrogen gas, a decrease in torque of the engine 10 due to the retardation of the ignition timing is suppressed.

(2) When the injection amount of the hydrogen gas is increased by the increasing process, the electronic control unit 20 performs an extending process for enlarging the injection permission period for permitting the injection of the hydrogen gas than when the injection amount is not increased. Therefore, even if the fuel pressure PF is decreased and the injection amount is increased, the required amount of injection of the hydrogen gas is less likely to be insufficient.

(3) The electronic control unit 20 performs the extending process by delaying the end timing during the synchronization while maintaining the start timing of the injection permission period. Therefore, it is possible to increase the injection permission period while suppressing both self-ignition of hydrogen gas and deterioration of ignitability.

(4) When the injection amount is increased by the increasing process, the electronic control unit 20 delays the end timing of the hydrogen gas injection by the injector 18 than when the injection amount is not increased. That is, the electronic control unit 20 delays the injection end timing IE in conjunction with the ignition timing. As a result, a change in the fuel pressure PF during the period from injection to ignition is suppressed. As a result, the ignitability is less likely to deteriorate.

(5) The engine control device of the present embodiment is applied to an engine 10 including a fuel tank 28 that stores hydrogen gas that is gaseous fuel, and a fuel pressure adjusting device 29 that reduces the pressure of the hydrogen gas in the fuel tank 28 to a predetermined set pressure P0 and supplies the reduced pressure to the injector 18. In such an engine 10, when the remaining amount of hydrogen gas in the fuel tank 28 decreases, the tank internal pressure PT decreases. When the tank internal pressure PT becomes lower than the set pressure P0, the fuel pressure PF of the injector 18 also becomes lower than the set pressure P0. Therefore, in such an engine 10, the inflow of the combustion gases to the injector 18 in accordance with the decrease in the fuel pressure PF is likely to occur. Therefore, in such an engine 10, the inflow of the combustion gases into the injector 18 in accordance with the decrease in the fuel pressure PF is suppressed, which is a remarkable advantage of the engine control device of the present embodiment.

Another Embodiment

The present embodiment can be modified and implemented as follows. The present embodiment and modification examples described below may be carried out in combination of each other within a technically consistent range.

The calculation mode of the injection increase ΔQS in S220 of steps in FIG. 3 may be changed. Even if the increase in engine torque due to the increase in the amount of hydrogen gas injection does not exactly correspond to the decrease in engine torque due to the retard of the ignition timing, if the injection amount is increased, the decrease in engine torque due to the retard of the ignition timing can be suppressed.

A sensor for detecting the fuel pressure PF may be installed in the engine 10 to determine whether the detected value of the sensor is equal to or less than the set pressure P0 in S120 of steps of FIG. 3.

When the injection amount of the hydrogen gas is increased by the increasing process, the injection end timing IE may not be delayed.

The extending process may be performed by advancing the start timing of the injection permission period. Further, the extending process may be performed by advancing the start timing of the injection permission period and delaying the end timing between the synchronization periods.

The extending process may not be performed. That is, the injection permission period may not be increased even when the amount of the hydrogen gas injected is increased by the increasing process.

The engine control in the above-described embodiment can be similarly applied to an engine using a gaseous fuel other than hydrogen gas.

APPENDICES

Appendix 1

A device that controls a spark ignition engine provided with an injector that injects gaseous fuel into a cylinder is an engine control device, and the engine control device executes: a retarding process of retarding an ignition timing of an air-fuel mixture in the cylinder after the gaseous fuel is injected when a fuel pressure that is a pressure of the gaseous fuel supplied to the injector is lower than a predetermined threshold value as compared with when the fuel pressure is equal to or more than the threshold value; and an increasing process of increasing an injection amount of the gaseous fuel by the injector when the ignition timing is retarded by the retarding process as compared with when the injection timing is not retarded.

Appendix 2

The engine control device according to Appendix 1 executes an extending process of extending an injection permission period in which an injection of the gaseous fuel is permitted when the injection amount is increased by the increasing process as compared with when the injection amount is not increased.

Appendix 3

In the engine control device according to Appendix 2, an extension of the injection permission period by the extending process is executed by delaying an end timing of the injection permission period while a start timing of the injection permission period is maintained.

Appendix 4

In the engine control device according to any one of Appendices 1 to 3, when the injection amount is increased by the increasing process, an end timing of an injection of the gaseous fuel by the injector is delayed as compared with when the injection amount is not increased.

Appendix 5

In the engine control device according to any one of Appendices 1 to 4, the engine includes a fuel tank that stores the gaseous fuel, and a fuel pressure adjusting device that reduces the pressure of the gaseous fuel in the fuel tank to a predetermined set pressure and supplies the gaseous fuel to the injector.

Appendix 6

In the engine control device according to any one of Appendices 1 to 5, an increase in the injection amount in the increasing process is executed by calculating an increase value of the injection amount of the gaseous fuel required for increasing an amount of engine torque equal to a decrease in the engine torque due to retardation of the ignition timing by the retarding process.

What is claimed is:

1. An engine control device that controls a spark ignition engine provided with an injector that injects gaseous fuel into a cylinder, the engine control device configured to execute:
    a retarding process of retarding an ignition timing of an air-fuel mixture in the cylinder after the gaseous fuel is injected when a fuel pressure that is a pressure of the gaseous fuel supplied to the injector is lower than a predetermined threshold value as compared with when the fuel pressure is equal to or more than the threshold value; and
    an increasing process of increasing an injection amount of the gaseous fuel by the injector when the ignition timing is retarded by the retarding process as compared with when the injection timing is not retarded.

2. The engine control device according to claim 1, configured to further execute an extending process of extending an injection permission period in which an injection of the gaseous fuel is permitted when the injection amount is increased by the increasing process as compared with when the injection amount is not increased.

3. The engine control device according to claim 2, wherein an extension of the injection permission period by the extending process is executed by delaying an end timing of the injection permission period while a start timing of the injection permission period is maintained.

4. The engine control device according to claim 1, wherein when the injection amount is increased by the increasing process, an end timing of an injection of the gaseous fuel by the injector is delayed as compared with when the injection amount is not increased.

5. The engine control device according to claim 1, wherein the engine includes:
    a fuel tank that stores the gaseous fuel; and
    a fuel pressure adjusting device that reduces the pressure of the gaseous fuel in the fuel tank to a predetermined set pressure and supplies the gaseous fuel to the injector.

6. The engine control device according to claim 1, wherein an increase in the injection amount in the increasing process is executed by calculating an increase value of the injection amount of the gaseous fuel required for increasing an amount of engine torque equal to a decrease in the engine torque due to retardation of the ignition timing by the retarding process.

* * * * *